United States Patent [19]

Lederman

[11] Patent Number: 4,782,931
[45] Date of Patent: Nov. 8, 1988

[54] OVERRUNNING CLUTCH WITH LUBRICANT COLLECTING AND DISTRIBUTING MEANS

[75] Inventor: Frederick E. Lederman, Sandusky, Ohio

[73] Assignee: General Motors Corporation, Detroit, Mich.

[21] Appl. No.: 92,758

[22] Filed: Sep. 3, 1987

[51] Int. Cl.$^4$ .................... F16D 13/74; F16D 47/04
[52] U.S. Cl. .................. 192/70.12; 192/48.3; 192/48.92; 192/113 B; 74/467
[58] Field of Search ............. 192/48.3, 48.92, 70.12, 192/113 B; 74/467; 184/6.12

[56] References Cited

U.S. PATENT DOCUMENTS

| | | | |
|---|---|---|---|
| 3,175,661 | 3/1965 | Maurer et al. | 192/113 B |
| 3,251,442 | 5/1966 | Aschauer | 192/113 B |
| 4,291,795 | 9/1981 | Charchian et al. | 192/113 B |
| 4,714,803 | 12/1987 | Lederman | 192/41 R |

FOREIGN PATENT DOCUMENTS

| | | | |
|---|---|---|---|
| 60-78161 | 5/1985 | Japan | 192/113 B |
| 61-38247 | 2/1986 | Japan | 74/467 |

2073338 10/1981 United Kingdom ............... 192/48.3

Primary Examiner—Leslie A. Braun
Assistant Examiner—David A. Testardi
Attorney, Agent, or Firm—Patrick M. Griffin

[57] ABSTRACT

An overrunning clutch used between the clutch plate pack and central shaft of an input clutch unit of a vehicle automatic transmission includes a lubricant collecting and distributing unit that acts in cooperation with the outer race of the overrunning clutch to eliminate the need for drilling lubricant supply holes through the outer race. The unit is fitted to the outer race so as to form a subassembly therewith, and an end plate of the unit is spaced from an end face of the outer race to form a lubricant collecting chamber. Feed channels formed with the unit extend axially along the outside of the outer race, opening into the chamber, and are sized so as to fit within the space occupied by an equal number of axial splines, which are left off of the outer race. Then, the subassembly may be easily installed by simultaneously fitting the splines on the outer race and the feed channels between the teeth of the clutch pack. The feed channels take lubricant from the chamber and distribute it between the interleaved clutch plates.

3 Claims, 2 Drawing Sheets

OVERRUNNING CLUTCH WITH LUBRICANT COLLECTING AND DISTRIBUTING MEANS

This invention relates to overrunning clutches in general, and specifically to an overrunning clutch assembly for use in the input clutch unit of a vehicle automatic transmission, and which includes a means to collect and distribute lubricant supplied from a central shaft of the transmission to and between the interleaved clutch plates of the input clutch unit.

BACKGROUND OF THE INVENTION

A typical vehicle automatic transmission includes at least one input clutch unit contained within a generally cylindrical housing through which a central shaft of the transmission coaxially extends. The input clutch unit includes a clutch plate pack made up of a first set of plates splined at their outer diameter to the inside of the housing and an interleaved second set of plates splined at their inner diameter to the outside of the outer race of an overrunning clutch. The overrunning clutch is located in the annular space between the clutch plate pack and the central shaft. A piston alternately forces the two sets of clutch plates together or releases them to selectively vary the power flow path through the transmission. The overrunning clutch serves as a speed sensor that matches the relative rotation of the clutch pack to the rotation of the central shaft so as to give a smoother transfer of power. When the two sets of clutch plates are released, they rotate very rapidly and closely relative to one another, which requires that a cooling lubricant be supplied between them to avoid overheating. That lubricant is typically supplied to the clutch plate pack, as well as to other components of the transmission, by being pumped down passages extending through or surrounding the central shaft. The lubricant is then directed radially outwardly to the clutch plate pack, either by pumping pressure, or by the centrifugal force of the overrunning clutch outer race, which rotates very rapidly whenever such lubricant is required, i.e., when the clutch plate pack is released. The lubricant is typically reaches the plate pack through holes drilled through the outer race, which holes provide a short, direct path. However, in order to deliver enough lubricant, a great number of such lubricant supply holes are often needed, and these must each be separately drilled in the outer race, which is expensive and time consuming. U.S. Pat. No. 4,714,803, assigned to the assignee of the current invention, discloses a roller clutch cage and seal combination that better confines lubricant between the clutch races, so as to more efficiently deliver lubricant through the outer race supply holes. While this can potentially reduce the number or size of such supply holes, it does not eliminate them altogether.

SUMMARY OF THE INVENTION

The invention completely eliminates the need for lubrication supply holes through the outer race of the overrunning clutch by providing a means that operates in cooperation with the outer race to direct lubricant around the overrunning clutch and to the clutch pack, rather than through the outer race of the clutch. In the preferred embodiment disclosed, this means is also disclosed as part of a subassembly combination with the outer race of the overrunning clutch, a subassembly that may be easily handled and installed, and which also serves to armor and protect the end face of the outer race. The preferred embodiment is disclosed in the input clutch unit of a vehicle transmission of the type in which the inner diameter of the second set of clutch plates has an evenly circumferentially spaced series of teeth thereon.

The cylindrical outer surface of the outer race is formed with a plurality of axial splines that interfit with the teeth on the second set of clutch plates, but a predetermined number of the splines, six in the embodiment disclosed, is left off. The outer race also has a generally annular end face that is perpendicular to the axis of the outer race, and, therefore, also perpendicular to the axis of the central shaft. A one piece lubricant collecting and distributing unit is designed to fit over the outer race to give an easily installed subassembly of the two. The unit has an annular end plate with an outer diameter approximately the same as the outer diameter of the outer race, but an inner diameter that is less than the inner diameter of the end face of the outer race. The end plate is axially offset from an annular flange that is sized to seat against the outer race end face and space the end plate away from the end face. The end face and end plate cooperate to create an annular chamber. Also integrally formed with the unit is a number of feed channels equal to the number of missing splines on the outer race, six in the embodiment disclosed. The feed channels are generally in the form of axially extending tubes, each opening into to the chamber and arranged in three diametrically opposed pairs of three different lengths. When the unit is slipped onto the outer race, the feed channels extend extend axially along the outer race outer surface, occupying a space or volume that is equal to or less than that which would have been occupied by the missing splines.

To install the subassembly, it is axially inserted into the annular space between the second set of clutch plates and the central shaft. As the subassembly is so installed, the splines slide between the teeth of the second clutch plates, as do the six similarly sized feed channels. After installation, the feed channels open beneath the gaps between the interleaved clutch plates. During operation of the transmission, the chamber formed by the end plate and the outer race end face captures lubricant that is thrown radially outwardly by the force of the rapidly rotating outer race. The captured lubricant is sent radially outwardly and then axially down the feed channels and ultimately out between the interleaved clutch plates, cooling them when the input clutch unit is disengaged. In addition, the end plate, which is wear resistant, acts to armor and protect the outer race end face against any other adjacent structure in the transmission.

It is, therefore, a general object of the invention to provide cooling lubricant between the clutch disks of the input clutch unit of an automatic vehicle transmission without the necessity of drilling supply holes through the outer race of the overrunning clutch.

It is another object of the invention to eliminate the supply holes by providing a lubricant collecting and distributing unit that that acts in cooperation with the outer race of the overrunning clutch to direct the lubricant around the overrunning clutch and between the plates, rather than through the overrunning clutch.

It is yet another object of the invention to provide a lubricant collecting and distributing unit that includes an end plate that forms a lubricant collecting chamber in cooperation with an end face of the outer race and a plurality of feed channels that send the lubricant from the chamber to the interleaved plates.

It is still another object of the invention to provide such a unit in which the feed channels fit into the space occupied by missing splines on the outer race, so that the unit and the outer race can form an easily installed subassembly.

DESCRIPTION OF THE PREFERRED EMBODIMENT

Figure 1:
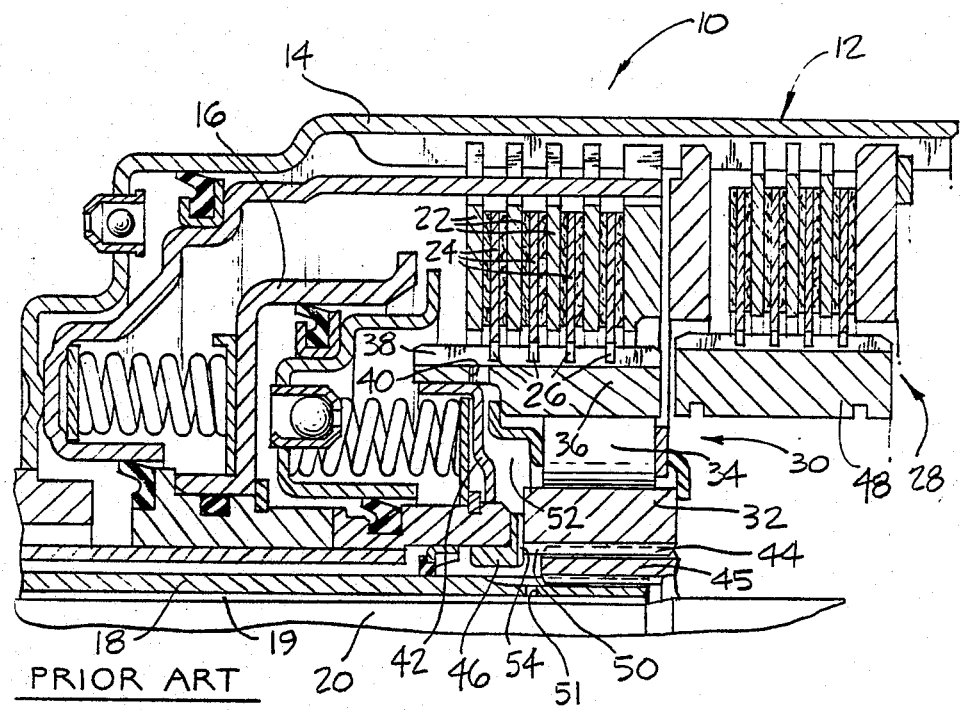
FIG. 1 shows a vehicle automatic transmission with an input clutch incorporating a conventional overrunning clutch of the type that has lubricant supply holes through the outer race.

Referring first to FIG. 1, the invention may be best described by first describing the environment in which both it and the prior art type of overrunning clutch is used. Illustrated is a typical vehicle automatic transmission, indicated generally at 10. Transmission 10 includes an input clutch unit, designated generally at 12, which serves to selectively connect and disconnect the power flow from the torque converter to the gear sets, which are not illustrated. Clutch unit 12 is contained within a generally cylindrical housing 14, which also contains a piston 16. A central tube 18 extends through housing 14, which serves as the power shaft for an overdrive clutch. Tube 18 surrounds and forms an extended central annular passage 19 with a central output shaft 20 of the transmission. Shaft 20 defines the central axis of the transmission 10 and of the various components that surround it. Clutch unit 12 also includes a clutch plate pack made up of a first set of plates 22 joined at their outer diameter to the inside of the housing 14 and an interleaved second set of plates 24 which include a series of evenly circumferentially spaced teeth 26 at their inner diameter. There is an annular space, indicated at 28, between the teeth 26 and the central shaft 20. The input clutch unit 12 also includes an overrunning roller clutch designated generally at 30, which serves as a speed sensor to match the relative rotation of the clutch pack of plates 22 and 24 to the central 20. Roller clutch 30 includes an inner cam race 32, a complement of caged rollers 34, and an outer race 36. Outer race 36 includes axial splines 38 formed in its outer surface, which interfit with the teeth 26, and a plurality of lubricant supply holes 40 drilled therethrough. In addition, a side ring 42 is pressed onto the outer race 36 at its left side, for a purpose described below. The most axially compact location in which to install roller clutch 30, as shown, is in the annular space 28. The inside of inner race 32 is splined at 44 to the end of input sun gear 45. The left face of inner race 32 abuts a thrust bearing 46. As is often the case in an input clutch unit like 12, another overrunning clutch, here a sprag clutch with an outer race 48, is located close on the right side of outer race 36. The two clutch outer races 36 and 48 can axially bump into one another during the operation of transmission 10, which the invention described below also addresses in its preferred embodiment. A thin annular space 50 is formed between the end of input sun gear 45 and thrust bearing 46, which is communicated with the annular passage 19 by hole 51 through tube 18 and the end of sun gear 45. The thin annular space 50 is communicated with the annular space 52 between inner and outer races 32 and 36 by several radial grooves 54 in the face of thrust bearing 46. As piston 16 forces the two sets of clutch plates 22 and 24 together or releases them to selectively vary the power flow path through the transmission 10. When released, clutch plates 22 and 24 rotate very rapidly and closely relative to one another, which requires that a cooling lubricant be supplied between them to avoid overheating. The source and flow of that lubricant is described next.

Figure 2:
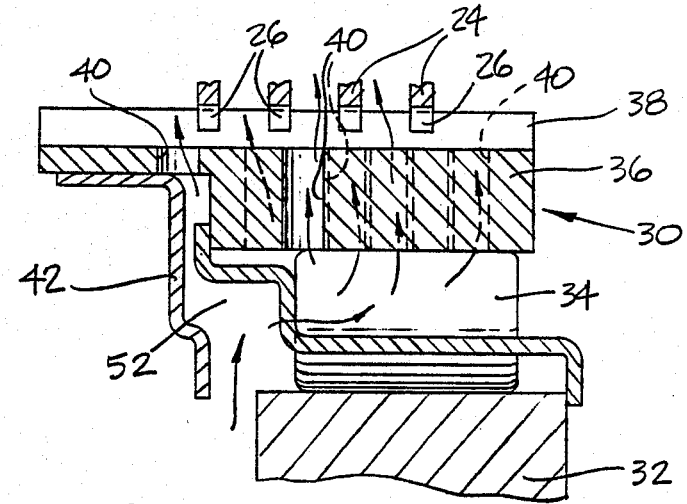
FIG. 2 is an enlarged cross section of the overrunning clutch of FIG. 1, illustrating the conventional type of lubricant flow between the clutch plates.

Referring next to FIGS. 1 and 2, lubricant is supplied under pressure from the central area provided by passage 19 and through the hole 51 to the annular space 50. From space 50, the pressure forces lubricant into space 52 through grooves 54 in the face of thrust bearing 46. From space 52, the force that directs lubricant radially is the centrifugal force imparted by the rapid rotation of the outer race 36, which is rotating whenever the piston 16 is disengaged and lubricant is consequently needed between the plates 22 and 24. Lubricant travels radially outwardly from space 52, where its flow to the left is substantially blocked by the side ring 42 described above. Its alternate flow path then, as shown by the arrows, is to the right through the caged rollers 32 and then radially outwardly through the various supply holes 40, between the interleaved plates 22 and 24. While this presents a very direct path, a path that can be assisted by the provision of a roller clutch seal of the type described in the patent application noted above, the supply holes 40 do present a manufacturing cost penalty. The invention avoids that cost penalty, as will be next described.

Figure 3:
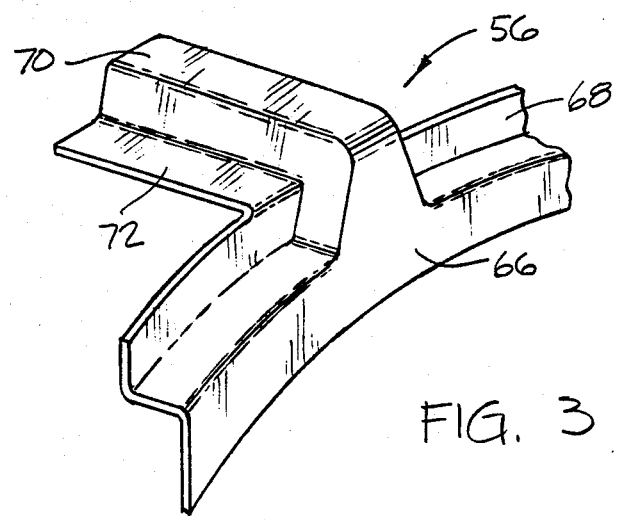
FIG. 3 is a perspective view of a preferred embodiment of the lubricant collecting and distributing unit of the invention.
Figure 4:
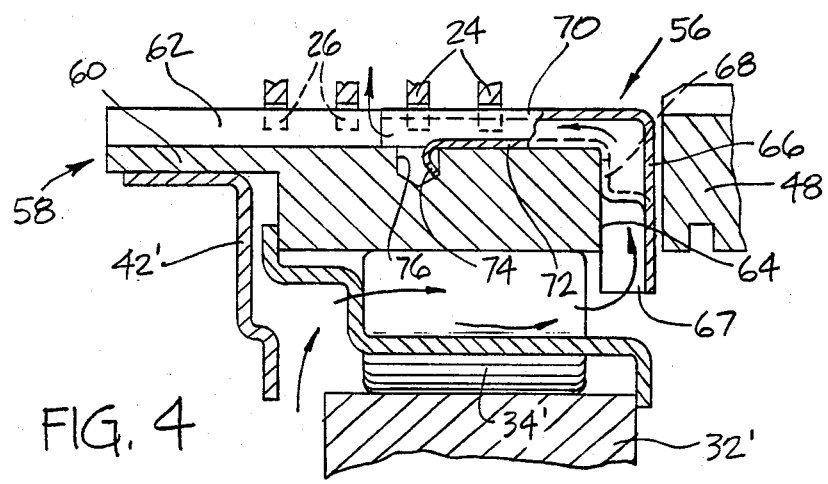
FIG. 4 is a view comparable to FIG. 2, but showing an overrunning clutch incorporating the preferred embodiment of the invention and the different lubricant flow.
Figure 5:
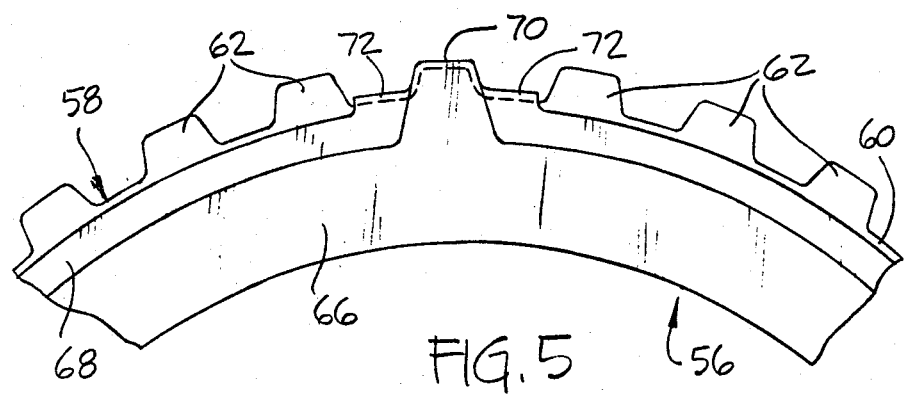
FIG. 5 is an end view of the subassembly comprising the overrunning clutch outer race and the lubricant collecting and distributing unit of the invention.

Referring now to FIGS. 3, 4 and 5, the invention provides a lubricant collecting and distributing unit, a preferred embodiment of which is shown generally at 56 and which may be referred to in shorthand form conveniently as just the unit 56. The environment in which unit 56 is used is a transmission 10 with an input clutch unit 12 identical to that described above, so like components are given the same number. Unit 56 acts in cooperation with a roller clutch designated generally at 58 of which the inner race, caged roller complement, and side ring are also all identical to the equivalent parts in the prior art roller clutch 30 described above. These identical roller clutch components are not given the same number as in FIGS. 1 and 2 above, since the roller clutch 58 overall is not identical, but are given the same number with a prime. The outer race of the roller clutch 58, while of the same general size as outer race 36 above, is not identical to outer race 36, and is numbered 60, since it has fewer axial splines 62 on its outer surface than the splines 38. Specifically, as best seen in FIG. 5, there is no spline 62 at six equally spaced locations. More importantly, outer race 60 has no supply holes drilled through it, and presents a completely smooth and uninterrupted cylindrical inner surface to the caged roller complement 34'. Like outer race 36, outer race 60 has a generally annular end face 64 that is, after installation, disposed in a plane perpendicular to the central shaft 20. Details of unit 56 and its cooperation with race 60 will be next described.

Referring still to FIGS. 3, 4 and 5, unit 56 is conveniently formed in one piece as a metal stamping of hard and wear resistant alloy. If unit 56 were molded of plastic, then a hard and wear resistant material such as nylon would be used. Unit 56 is formed with an annular end plate 66 which has an outer diameter approximately the same as that of the outer race end face 64, but which has a smaller inner diameter, for a purpose described below. End plate 66 is axially offset from an annular flange 68 that is sized so as to seat against end face 64. Also integrally stamped with the unit 56 are six feed channels 70, one corresponding to each missing spline 62, which extend generally parallel to one another and coaxial to end plate 66. Flaring off from each side of each feed channel 70 is a side flange 72. Feed channels 70 are generally in the form of tubes, although they are closed on only three sides. While FIG. 3 shows only one feed channel 70, it should be understood that while they have the same cross sectional area, channels 70 are not all of the same length. Instead, the fed channels 70 comprise three diametrically opposed pairs, each pair having a different length, for a reason described below. Finally, a retention tab 74 is bent downwardly from any one of the side flanges 72 of one channel 70.

Referring next to FIGS. 4 and 5, unit 56 is joined to outer race 60 by sliding the side flanges 72 into the spaces left by the missing splines 62 until annular annular flange 68 seats on end face 64. This serves to space the end plate 66 away from and create an annular chamber 67 in cooperation with the end face 64. While unit 56 could be retained to race 60 just by the closeness of fit of the feed channel side flanges 72 to the outer surface of outer race 60, here extra retention force is added by the tab 74 snapping into a small bore 76 in the outside surface of outer race 60. Thus, a subassembly of unit 56 and outer race 60 is created, which may be handled as one part. As best seen in FIG. 5, once unit 56 is so attached to outer race 36, each feed channel fits generally within the space or envelope that would have been occupied by the missing splines 62. The closeness of fit between the side flanges 74 and the outer surface of outer race 60 cooperates to create six tubes or passages that are closed on all four sides, and which open into chamber 67. It is the cooperation between outer race 60 and unit 56, as well as the subassembly they provide, that most directly constitutes the invention. However, it is even more advantageous to join that subassembly together with the entire roller clutch 58 to create an even larger subassembly, as seen in FIG. 4.

Referring to FIG. 4, to install the subassembly of outer race 60 and unit 56, it is axially inserted into the annular space 28. As the subassembly is so installed, the splines 62 slide between the second clutch plate teeth 26, as do the six feed channels 70. In the particular case here illustrated, this installation is conveniently achieved by installing the entire roller clutch 58, which carries the outer race 60-unit 56 subassembly with it. Installation, therefor, proceeds just as with the prior art roller clutch 30 above. After installation, the feed channels 70 extend axially between the outer surface of race 60 and the second plates 24, and open beneath the gaps between the interleaved clutch plates 22 and 24. The removal of six splines 62 leaves more than enough connection between the teeth 26 and the outer race splines 62. During operation of the transmission 10, lubricant initially follows the same path described above, flowing eventually into annular space 52, on the left side of the roller clutch 58. It is then sent radially outwardly by the centrifugal force of the rapidly rotating outer race 60. However, since flow to the left is substantially blocked by the side ring 42' and there are no holes drilled through outer race 60, the lubricant flows axially to the right, through the caged complement of rollers 34', where it is captured and collected in the chamber 67. While the inner edge of annular end plate 66 does not extend all the way to the inner race 32, it extends far enough that sufficient lubricant will be captured in chamber 67, given the strong centrifugal force supplied by the rapidly rotating outer race 60. The inner edge of end plate 66 could be extended farther, if desired, so as to capture more lubricant in an environment where the centrifugal force was not as great. Within chamber 67, the captured lubricant is forced radially outwardly, up the end face 64, at which point its only possible path is axially to the left, down the passages formed by the feed channels 70 in cooperation with the outer surface of the outer race 60. Ultimately, he lubricant exits the various length feed channels 70. Although only one feed channel 70 and its flow path appears in FIG. 4, it will be understood that the three different lengths of the three opposed pairs of feed channels 70 are are tailored to assure that some lubricant will be distributed to each gap between the interleaved clutch plates 22 and 24, cooling them when the input clutch unit 12 is disengaged. In addition, end plate 66, formed as it is of wear resistant material and rigidly spaced from outer race end face 64 by the annular flange 68, acts to armor and protect the outer race end face 64 against axial bumping by the adjacent sprag clutch outer race 48. This axial bumping is very prevalent in the automatic transmission environment, since many components, such as splined disk packs, pistons, and overrunning clutches, are mounted so as to move or float axially relative to one another, often under considerable force, and often with differentials in rotational speed. The preferred embodiment of the unit 56 disclosed provides the armoring function with no additional structure.

Variations of the preferred embodiment o the lubricant collecting and distributing unit 56 disclosed may be made within the broad objectives of the invention. The unit 56 could be formed with as few as one feed channel 70 in an environment where the demand for cooling lubricant was not as great. Furthermore, the unit 56 need not be combined as a subassembly with the outer race 60, but could be added after the race 60, or the whole roller clutch 58, had already been installed, so long as there was room for the feed channels 70 to be fitted between the outer surface of the outer race 60 and the interleaved clutch plates 22 and 24. However, the preferred embodiment is particularly useful, given the fact that is very common for the second clutch plates 24 to be splined to the outer surface of the outer race 60, and sizing the feed channels 70 so as to be disposable within the envelope of the missing splines 62 and retaining the unit 56 to the outer race 60 as a subassembly makes for a very convenient installation. In an environment where the axial bumping of components adjacent to the overrunning clutch 58 was not a problem, the rigidity and wear resistant properties of the end plate 66 would not be necessary. However, as noted above, that is very often a concern in the automatic transmission environment, and the armoring of the end plate 66 is very economically provided. Therefor, it will be understood that the invention is not intended to be limited to just the preferred embodiment disclosed.

The embodiments of the invention in which an exclusive property or privilege is claimed are defined as follows:

1. In a vehicle transmission of the type having a central shaft defining an area from which lubricant is supplied and sent generally radially outwardly and an input clutch unit having a plurality of first clutch plates and a plurality of second clutch plates interleaved with the first and said first and second clutch plates being radially spaced from said central shaft to define an annular space, said interleaved clutch plates spinning rapidly relative to and closely to one another when said input clutch unit is disengaged, said input clutch unit also including an overrunning clutch in said annular space having an outer race with a generally annular end face lying in a plane generally perpendicular to the axis of said central shaft and a generally cylindrical outer surface joined to the inner diameter of said second clutch plates, a means to collect lubricant and direct it around said overrunning clutch and between said interleaved plates when said input clutch unit is disengaged, said means comprising, a generally annular end plate joined to said outer race and spaced from said outer race end face so as to form a chamber in cooperation with said end face, said end plate extending radially inwardly toward said central shaft sufficiently far so as to capture lubricant in said chamber to be directed radially outwardly along said outer race end face, and, at least one feed channel opening to said chamber and extending axially between said outer race outer surface and said second clutch plates so as to distribute lubricant from said chamber between said interleaved clutch plates when said input clutch unit is disengaged.

2. In a vehicle transmission of the type having a central shaft defining an area from which lubricant is supplied and sent generally radially outwardly and an input clutch unit having a plurality of first clutch plates and a plurality of second clutch plates interleaved with the first and said first and second clutch plates being radially spaced from said central shaft to define an annular space, said interleaved clutch plates spinning rapidly relative to and closely to one another when said input clutch unit is disengaged, said input clutch unit also including an overrunning clutch in said annular space having an outer race with a generally annular end face lying in a plane generally perpendicular to the axis of said central shaft and a generally cylindrical outer surface joined to the inner diameter of said second clutch plates, a means to collect lubricant and direct it around said overrunning clutch and between said interleaved plates when said input clutch unit is disengaged, said means comprising, a plurality of axially extending splines on said cylindrical surface interfittable with a plurality of teeth on said second clutch plates, said plurality of splines being less than said teeth by a predetermined number, and a lubricant collecting and distributing unit fitted to said outer clutch race so as to form a subassembly therewith and including a plurality of feed channels equal to said predetermined number and each extending axially along said outer race cylindrical outer surface, said feed channels further being sized so as to fit within a volume generally equal to that occupied by a said spline and opening to a chamber formed by a generally annular end plate of said unit that is spaced from said outer race end face, whereby, said subassembly may be installed by inserting said outer race into said annular space, thereby interfitting said splines with said teeth to join said outer race to said second clutch plates as said feed channels simultaneously slide between said teeth, after which said feed channels open radially inwardly of said interleaved plates and said end plate extends radially inwardly toward said central shaft sufficiently far so as to capture lubricant in said chamber to be directed radially outwardly along said outer race end face and then distributed through said feed channels to and between said interleaved clutch plates when said input clutch unit is disengaged.

3. In a vehicle transmission of the type having a central shaft defining an area from which lubricant is supplied and sent generally radially outwardly and an input clutch unit having a plurality of first clutch plates and a plurality of second clutch plates interleaved with the first and said first and second clutch plates being radially spaced from said central shaft to define an annular space, said interleaved clutch plates spinning rapidly relative to and closely to one another when said input clutch unit is disengaged, said input clutch unit also including an overrunning clutch in said annular space having an outer race with a generally annular end face lying in a plane generally perpendicular to the axis of said central shaft and a generally cylindrical outer surface joined to the inner diameter of said second clutch plates, a means to collect lubricant and direct it around said overrunning clutch and between said interleaved plates when said input clutch unit is disengaged, said means comprising, a plurality of axially extending splines on said cylindrical outer surface interfittable with a plurality of teeth on said second clutch plates, said plurality of splines being less than said plurality of teeth by a predetermined number, and, a lubricant collecting and distributing unit fitted to said outer clutch race so as to form a subassembly therewith and including a plurality of feed channels equal to said predetermined number and each extending axially along said outer race cylindrical outer surface, said feed channels further being sized so as to fit within a volume generally equal to that occupied by a said spline, said feed channels opening to a chamber formed by a generally annular end plate formed of a wear resistant material and rigidly spaced from said outer race end face by an integrally stamped flange seated against said said outer race end face, whereby, said subassembly may be installed by inserting said outer race into said annular space, thereby interfitting said splines with said teeth to join said outer race to said second clutch plates as said feed channels simultaneously slide between said teeth, after which said feed channels open radially inwardly of said interleaved plates and said end plate extends radially inwardly toward said central shaft sufficiently far so as to capture lubricant in said chamber to be directed radially outwardly along said outer race end face and then through said feed channels to and between said interleaved clutch plates when said input clutch unit is disengaged, said end plate also serving, after installation, to armor and protect said outer race end face.

* * * * *